United States Patent
Kang

(10) Patent No.: US 8,872,784 B2
(45) Date of Patent: *Oct. 28, 2014

(54) CHARACTER INPUT METHOD AND APPARATUS IN PORTABLE TERMINAL HAVING TOUCH SCREEN

(71) Applicant: Samsung Electronics Co., Ltd., Gyeonggi-do (KR)

(72) Inventor: Hee-Jun Kang, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/026,689

(22) Filed: Sep. 13, 2013

(65) Prior Publication Data

US 2014/0009427 A1     Jan. 9, 2014

Related U.S. Application Data

(63) Continuation of application No. 12/276,812, filed on Nov. 24, 2008, now Pat. No. 8,558,800.

(30) Foreign Application Priority Data

Nov. 23, 2007  (KR) .................... 10-2007-0120268

(51) Int. Cl.
*G06F 3/041*   (2006.01)
*G06F 3/0488*  (2013.01)
*G06F 3/023*   (2006.01)
*G06F 3/0484*  (2013.01)
*G06F 3/0486*  (2013.01)

(52) U.S. Cl.
CPC ........ *G06F 3/04883* (2013.01); *G06F 3/04886* (2013.01); *G06F 3/0236* (2013.01); *G06F 3/04842* (2013.01); *G06F 3/0486* (2013.01)
USPC ............ 345/173; 345/160; 345/168; 345/418

(58) Field of Classification Search
USPC .................. 345/173, 168, 160, 418
See application file for complete search history.

(56) References Cited

U.S. PATENT DOCUMENTS

| | | | |
|---|---|---|---|
| 6,331,840 B1 | 12/2001 | Nielson et al. | |
| 7,477,243 B2 | 1/2009 | Ogawa et al. | |
| 8,019,389 B2 | 9/2011 | Kim et al. | |
| 2004/0051709 A1* | 3/2004 | Ogawa et al. | 345/418 |
| 2005/0052431 A1 | 3/2005 | Chang | |
| 2005/0162402 A1* | 7/2005 | Watanachote | 345/173 |
| 2006/0109259 A1* | 5/2006 | Ohta | 345/173 |
| 2007/0229476 A1 | 10/2007 | Huh | |

(Continued)

FOREIGN PATENT DOCUMENTS

| | | |
|---|---|---|
| JP | 2005-182487 | 7/2005 |
| KR | 1020030008873 | 1/2003 |
| KR | 100772453 | 11/2007 |

*Primary Examiner* — Thuy Pardo
(74) *Attorney, Agent, or Firm* — The Farrell Law Firm, P.C.

(57) ABSTRACT

A character input method and apparatus in an electronic terminal are provided. The character input method includes displaying a virtual keypad having at least one key area to which a plurality of characters are associated, displaying a plurality of areas when a touch is detected on the at least one key area, detecting whether the touch includes a drag and inputting, after the drag is detected, a character mapped to an area corresponding to a point where the drag is released.

27 Claims, 4 Drawing Sheets

(56) References Cited

U.S. PATENT DOCUMENTS

| | | |
|---|---|---|
| 2008/0117179 A1 | 5/2008 | Noh |
| 2009/0122018 A1* | 5/2009 | Vymenets et al. ............ 345/173 |
| 2009/0303187 A1 | 12/2009 | Pallakoff |
| 2010/0156837 A1 | 6/2010 | Maw |
| 2011/0234524 A1 | 9/2011 | Longe et al. |

* cited by examiner

CHARACTER INPUT METHOD AND APPARATUS IN PORTABLE TERMINAL HAVING TOUCH SCREEN

PRIORITY

This application is a Continuation of U.S. application Ser. No. 12/276,812, which was filed in the U.S. Patent and Trademark Office on Nov. 24, 2008, and claims priority to an application entitled "CHARACTER INPUT METHOD AND APPARATUS IN PORTABLE TERMINAL HAVING TOUCH SCREEN" filed in the Korean Intellectual Property Office on Nov. 23, 2007 and assigned Serial No. 10-2007-0120268, the contents of which are incorporated herein by reference.

BACKGROUND OF THE INVENTION

1. Field of the Invention

The present invention relates generally to a character input method and apparatus in a portable terminal having a touch screen, and more particularly, to a character input method and apparatus in a portable terminal having a touch screen that can input a character using a virtual keypad in which a plurality of characters is allocated to one key area.

2. Description of the Related Art

In general, a conventional touch screen includes a display unit and a touchpad arranged in the display unit. The touch screen is currently being applied to various electronic devices adopting a graphical user interface, such as a PDA (Personal Digital Assistant), a navigation system, POS (Point-Of-Sale) system, ATM (Automatic Teller Machine), a portable multimedia player and a mobile communication terminal.

The touch screen is an important development in the field of input devices, as a suitable space for arranging an input unit cannot be easily secured in many modern electronic devices due to size limitations.

In a conventional character input method using a touch screen, a character is input on the touch screen by displaying a QWERTY-type virtual keypad similar to a computer keyboard.

However, a touch screen installed in a portable terminal should have a small size due to the compact nature of the portable terminal. Thus, if a QWERTY virtual keypad is used for character input, a display area allocated to each key becomes small. This can cause difficulties in making a precise touch for desired key input. Further, if a touch is generated outside a central area of the key, a controller may incorrectly determine that a plurality of keys is being touched.

The problem with the QWERTY virtual keypad can be addressed by decreasing the number of keys and enlarging the key area using a virtual keypad in which a plurality of characters is allocated to each key area.

This method can prevent the error of mistakenly pressing a key area, but a user has to inconveniently repeatedly press the key area for inputting a character.

SUMMARY OF THE INVENTION

The present invention has been made in view of the above problems, and provides a character input method and apparatus in a portable terminal having a touch screen that does not require repeated pressing of a key area for inputting a character, to save time for character input.

Further, the present invention provides a method and apparatus for inputting a character in a portable terminal having a touch screen that can provide a virtual keypad identical to a conventional keypad of a portable terminal, to provide convenience for a user who is accustomed to the conventional usage.

In the present invention, a character input method is provided that displays a virtual keypad having at least one key area to which a plurality of characters are associated, displays a plurality of areas when a touch is detected on the at least one key area, detects whether the touch includes a drag, and inputs, after the drag is detected, a character mapped to an area corresponding to a point where the drag is released.

In the present invention, a character input apparatus is provided that includes a touch screen configured to detect a touch and a drag, and a controller configured to control display on the touch screen of a virtual keypad having at least one key area to which a plurality of characters are allocated, control display of a plurality of areas when a touch is detected on the at least one key area, and, after the drag is detected, control input of a character mapped to an area corresponding to a point where the drag is released.

BRIEF DESCRIPTION OF THE DRAWINGS

The above and other objects, features and advantages of the present invention will be more apparent from the following detailed description in conjunction with the accompanying drawings, in which.

DETAILED DESCRIPTION OF THE PREFERRED EMBODIMENTS

Hereinafter, preferred embodiments of the present invention are described in detail with reference to the accompanying drawings. The same reference numbers are used throughout the drawings to refer to the same or similar parts. Detailed descriptions of well-known functions and structures incorporated herein may be omitted for the sake of clarity and conciseness.

Hereinafter, terms used in the specification of the present invention should not be limited to their ordinary meanings. These terms should be interpreted in terms of technical aspects of the present invention.

In the following description, characters arranged in a virtual keypad displayed on a touch screen are given as characters of the English language. However, the present invention can be applied to other languages. Further, characters allocated to one key area are mapped to a plurality of concentric circles having different diameters. However, the present invention is not limited to the concentric circles, and can be applied to a plurality of divided areas having various shapes.

A terminal having a touch screen according to the present invention can be applied to any information communication device and multimedia device, such as a navigation terminal, POS terminal, ATM, electronic dictionary, digital broadcasting terminal, PDA, smart phone, IMT-2000 (International Mobile Telecommunication 2000) terminal, CDMA (Code Division Multiple Access) terminal, WCDMA (Wideband Code Division Multiple Access) terminal, GSM (Global System for Mobile communication) terminal, UMTS (Universal Mobile Telecommunication Service) terminal, palmtop computer and laptop computer and their applications.

Hereinafter, it is assumed that a touch screen includes a touchpad for sensing a touch and a drag motion, and a display unit for displaying a virtual keypad for character input in a character input mode.

The term 'touch' refers to a motion in which a user contacts a specific area on a touch screen with a finger or a touch pen. The term 'drag' refers to a motion in which a user touches a specific area on a touch screen with a finger or a touch pen and then, without releasing the touch from the touch screen, moves the touch to another specific area. The touch pen refers to a pen-type device for touching a touch screen.

Figure 1:
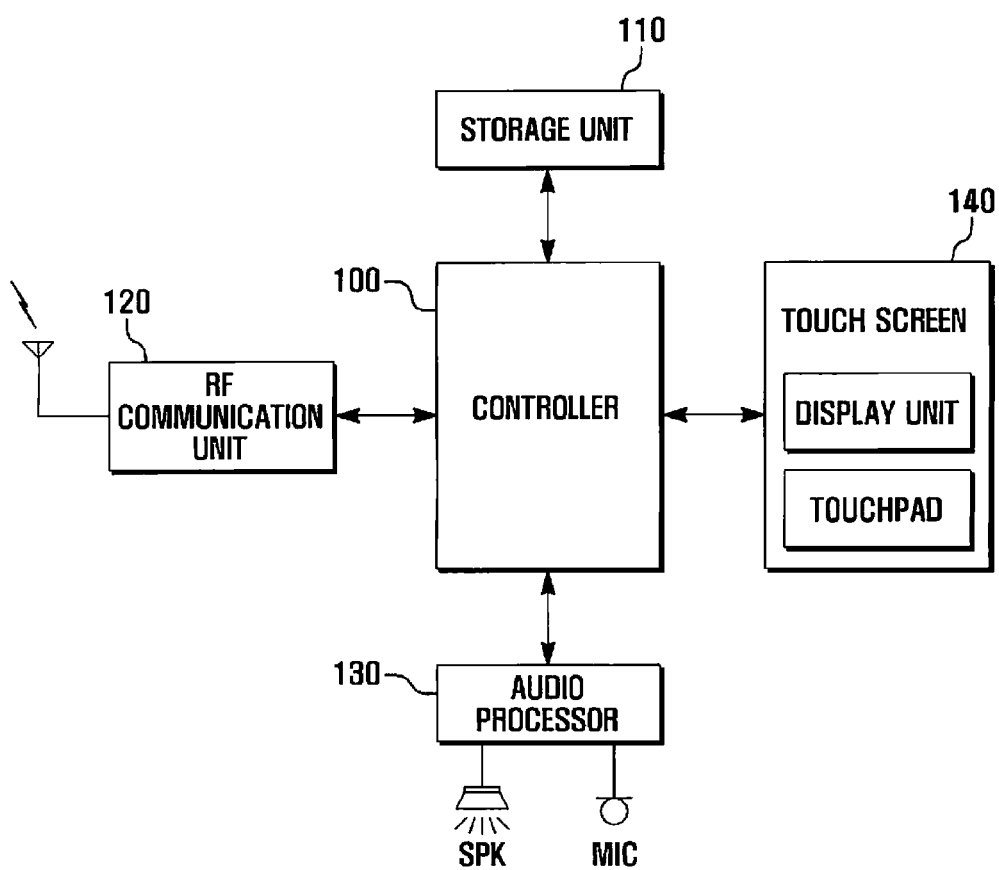
FIG. 1 illustrates a portable terminal according to a preferred embodiment of the present invention.

FIG. 1 illustrates a portable terminal according to a preferred embodiment of the present invention.

Referring to FIG. 1, the portable terminal includes a controller 100, a storage unit 110, a Radio Frequency (RF) communication unit 120, an audio processor 130, and a touch screen 140.

The controller 100 controls the operations of the portable terminal and signal flows between units of the portable terminal, and may include a data processing function. In particular, in a character input mode, the controller 100 controls to display a virtual keypad on a display unit of the touch screen 140. Further, if a touch is generated in a key area of the virtual keypad, the controller 100 controls to display a plurality of concentric circles or divided areas in a region surrounding the touched key area. If a drag is generated, the controller 100 determines the length of the drag.

The controller 100 compares the length of the drag with a radius of each concentric circle to identify a concentric circle at which the drag is released. Then, the controller 100 determines information about characters mapped to the concentric circle at the drag release in the storage unit 110 and displays the character information on the touch screen 140. For this, the controller 100 may identify the concentric circle at the drag release by determining a distance from a point of touch generation to a point of drag release or by coordinates of the point of drag release. Then, the controller 100 displays the characters mapped to the identified concentric circle on the touch screen.

The storage unit 110 stores programs required for performing functions according to the present invention and various data. To this end, the storage unit 110 may include a program area and a data area.

The program area stores a program for controlling the operations of the portable terminal, an operating system for booting the portable terminal, an application program required for multimedia contents reproduction, and other application programs required for optional functions of the portable terminal, such as a camera function, and sound, image and moving picture reproduction.

The controller 100 provides each function using the corresponding application program according to user selection. Particularly, the program area may store an application program for processing a touch and a drag generated on the touch screen 140.

The data area stores data generated according to the use of the portable terminal. For example, the data area may store images and moving pictures photographed according to a camera function, a phone book, audio and user data and corresponding contents. In particular, the data area stores a virtual keypad for inputting a character. The virtual keypad may have various formats according to a provided language alphabet and characters. That is, a virtual keypad arrangement and the number of characters allocated to each key area may change according to the characters to be provided, such as for various languages and other symbols.

Further, information about a diameter of each concentric circle generated when each key area is touched and information about a character mapped to each concentric circle may be stored in the data area. Alternatively, information about positions of a plurality of divided areas and information about a character mapped to each divided areas may be stored in the data area.

The RF communication unit 120 provides a communication channel for data and voice communication between the portable terminal and a base station and performs radio frequency communication for transmitting and receiving contents and a control signal relating to the contents through interconnection with a web server. The RF communication unit 120 includes an RF transmitting unit for amplifying a signal to be transmitted and up-converting a frequency thereof under the control of the controller 100, so as to transmit a completed message, and an RF receiving unit for low noise amplifying a received signal and down-converting a frequency thereof to transmit the signal to the controller 100.

The audio processor 130 receives an audio data signal from the controller 100 and converts the received audio data signal into audio sound under the control of the controller 100, and outputs the audio sound through a Speaker (SPK). Further, the audio processor 130 converts an audio signal of a voice or sound input through a MICrophone (MIC) into data and outputs the data to the controller 100 for transmission through the RF communication unit 120.

In particular, when a touch is generated on the touch screen 140, the audio processor 130 outputs an audio signal indicating the touch generation, and when a drag is released from the touch screen 140, the audio processor 130 outputs an audio signal indicating the drag release.

The touch screen 140 includes a display unit and a touchpad arranged on a surface of the display unit. The display unit displays various menus of the portable terminal and user input information. The display unit may be embodied as an LCD (Liquid Crystal Display), but is not limited thereto. The display unit may be embodied as any display unit on which a touchpad can be arranged, for example a CRT (Cathode-Ray Tube) display unit, an OLED (Organic Light Emitting Diode) display unit, a PDP (Plasma Display Panel) and their applications.

Further, the display unit displays a virtual keypad for inputting a character and a character input window for displaying the inputted character. If a touch is generated in a key area, the display unit displays a plurality of concentric circles or divided areas corresponding to characters allocated to the touched key area.

The touchpad includes a touch sensor for sensing a touch generated on a surface of the touchpad, and detects coordinates of the touch generation location. The touchpad may be implemented using a pressure sensing, pressure reducing, resistive membrane, electrostatic capacitive sensing, ultrasonic reflection, optical sensing or an induction method. For example, the optical touchpad may be configured such that a plurality of light emitting elements and light receiving elements are arranged facing each other around a display area.

Light, such as infrared waves, is emitted from the light emitting elements and received by the light receiving elements passing through the display area. In this case, the touchpad may further include a separate circuit for controlling to drive the display area and the light emitting and receiving elements. In the optical touchpad, the light emitting elements are aligned with the light receiving elements at a set distance, and a coordinate value for the light-receiving element corresponding to each light-emitting element is preset.

If a user touches a display area, a coordinate value for the light-receiving element blocked by the touch is detected and transmitted to the controller 100. In particular, if a user generates a drag in a character input mode, the touchpad may transmit information about the drag generation to the controller 100. Alternatively, the touchpad may transmit coordinate information about the location of drag release to the controller 100.

The length of the drag or the coordinate information about the drag release location can be used to determine a character input by a user. That is, if a touch is generated in a key area, a plurality of concentric circles having different diameters or, a plurality of divided areas, are displayed in the display unit. Each concentric circle or divided area corresponds to one of the characters allocated to the touched key area. The mapping information and the information about each concentric circle or divided area are stored in the storing unit 110.

The portable terminal according to the present invention may further include a camera unit and a digital multimedia broadcasting unit.

Figure 2:
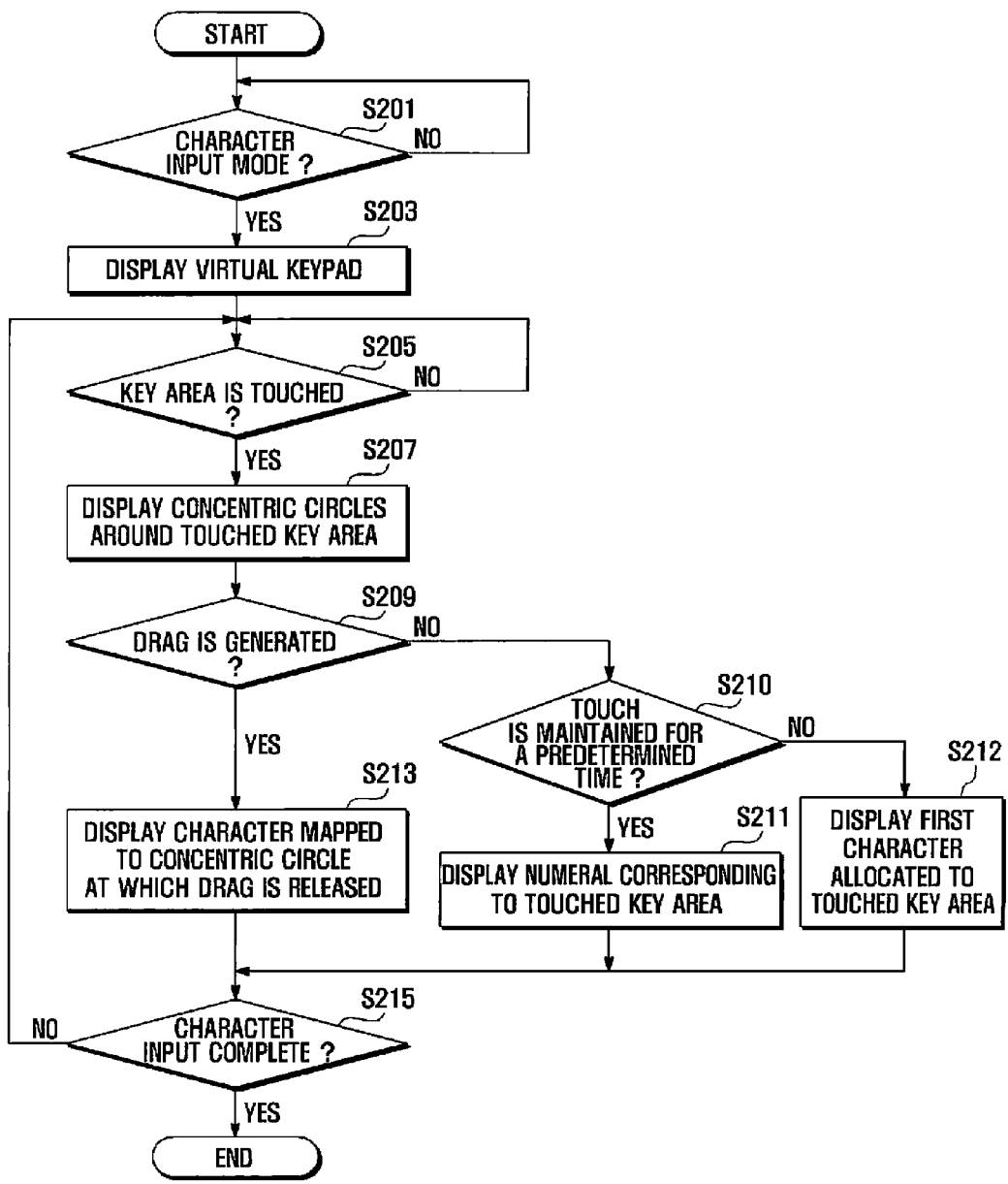
FIG. 2 is a flow chart illustrating a character input method in a portable terminal according to a preferred embodiment of the present invention.

FIG. 2 illustrates a character input method using the touch screen 140 according to a preferred embodiment of the present invention.

Referring to FIG. 2, if the mobile terminal is in a character input mode (S201), the controller 100 displays a virtual keypad having at least one key area to which a plurality of characters is allocated on the touch screen 140 (S203). The controller 100 further displays a character input window for displaying the character inputted to the virtual keypad. The controller 100 changes a layout of the virtual keypad and the quantity of characters allocated to one key area according to characters.

The controller 100 then determines whether a touch is generated in a key area of the virtual keypad (S205). If a touch is sensed in a key area, the controller 100 displays concentric circles having different diameters around the touched key area, the number of concentric circles being equivalent to the number of the characters allocated to the touched key area (S207). Only one character is mapped to each concentric circle. The mapping information and the diameter information about the concentric circles may be stored in the storage unit 110.

Then, the controller 100 determines whether a drag is generated (S209). If a drag is generated, the controller 100 determines the length of the drag or coordinates of a point at which the drag is released to identify a concentric circle corresponding to the drag release point, and displays a character mapped to the identified concentric circle on the character input window (S213). If a drag is not generated at step S209, the controller 100 determines whether a touch is maintained for a predetermined time at the touched key area (S210). If a touch is maintained for a predetermined time without a drag, the controller 100 may display a numeral allocated to the touched key area (S211). If a touch is not maintained for a predetermined time, the controller 100 may display a first character among the characters allocated to the touched key area (S212). The predetermined touch maintenance time for input of a numeral may be stored in the storage unit 110.

The controller 100 then determines whether character input is complete (S215). The controller 100 may determine that character input is complete by detecting a key signal notifying of the character input completion or by detecting a movement from a character input region of the touch screen 140 to another information input region, such as a phone number input section.

If the controller 100 determines that character input is complete, the controller 100 terminates the character input. If the controller 100 determines that character input is not complete, the controller 100 repeatedly performs steps S205 to S215 to input subsequent characters. Subsequent characters are input until the character input mode is terminated.

Hereinafter, an example of using the character input method when a plurality of English characters is allocated to each key area of a virtual keypad is described with reference to FIGS. 3A, 3B and 4.

Figure 3A:
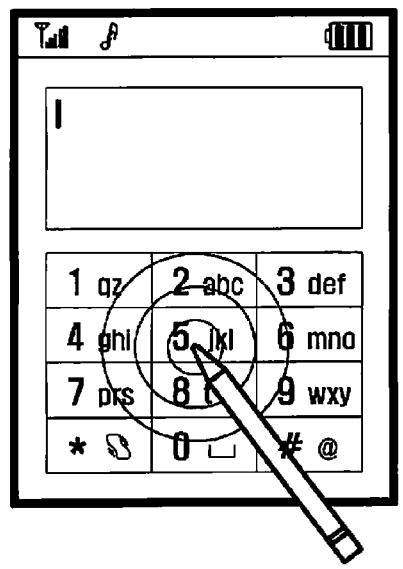
FIG. 3A illustrates a screen showing a process of generating a touch in a key area in the method of FIG. 2.

In FIG. 3A, a numeral key area '5' of a virtual keypad is touched for character input. In this case, three concentric circles having different diameters are displayed around the touched area. The concentric circles may be distinguishable by lines or colors. In FIG. 3A, English characters allocated to the numeral key area '5' are 'j', 'k' and 'l'. A character 'j' is mapped to the smallest circle area, a character 'k' is mapped to the medium circle area and a character 'l' is mapped to the largest circle area. However, the mapping order is not limited thereto.

As described in the character input method, the controller 100 then determines a character to be input by the user by determining the length of a subsequent drag or coordinates of a point at which a subsequent drag is released, and displays the character in the display unit.

Figure 3B:
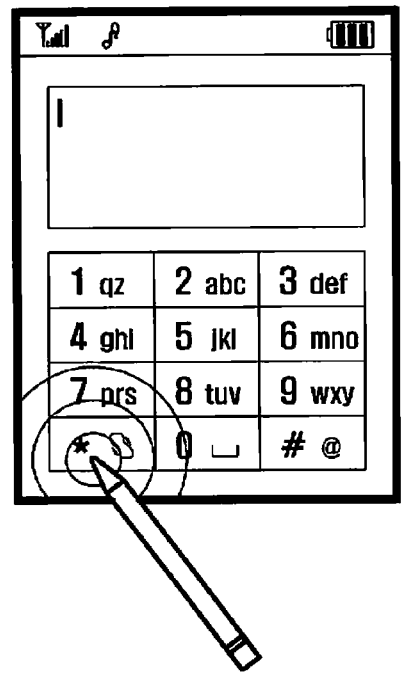
FIG. 3B illustrates a screen showing the process of generating a touch in a key area in the method of FIG. 2.

In FIG. 3B, a touch is generated on an asterisk key area '*'. When the asterisk key area '*' is positioned at a corner of the display unit, complete concentric circles cannot be displayed in the display unit. That is, the display unit can display only part of the concentric circles, as shown in FIG. 3B. Alternatively, if there is no allocated character, the display unit may not display a concentric circle.

The asterisk key area '*' may also be used as a menu key for selecting a language or predetermined symbols. For example, characters of the Korean language may be mapped to a first concentric circle of the asterisk key area, English lower case letters may be mapped to a second concentric circle, and English upper case letters may be mapped to a third concentric circle. In this case, the number of the concentric circles can be changed to correspond to various languages, symbols or emoticons.

Figure 4:
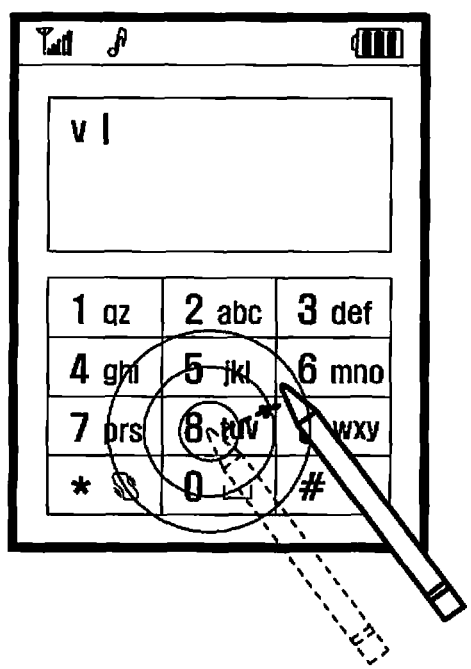
FIG. 4 illustrates a screen showing a process of inputting a character in the method of FIG. 2.

FIG. 4 illustrates a screen showing a character input by a drag on the touch screen.

Referring to FIG. 4, if a user, after touching a numeral key area 8, generates a drag into the largest circle among three concentric circles, the controller 100 searches mapping information stored in the storage unit 110 to identify a corresponding character, and displays the character 'v' mapped to the largest circle in the character input window on the display unit.

According to the embodiment of FIG. 4, three English letters are allocated to each key area, but the number of characters allocated to each key area may be increased or decreased, and accordingly, the number of the concentric circles or divided areas may be increased or decreased. Further, the number of characters allocated to a key area may differ for each key area, and accordingly, the number of the concentric circles or divided areas may be different for each key area corresponding to the number of characters allocated to a specific key area.

In this embodiment, a numeral is input by maintaining a touch for a predetermined time without a drag; however, the numeral may alternatively be mapped to an additional concentric circle or divided area.

Although not shown in FIGS. 3A, 3B and 4, the virtual keypad may further include a shortcut key and a function key such as a menu key, cancel key and phone directory key.

As described above, a character input method and an apparatus in a portable terminal having a touch screen can prevent a character input error by displaying a large divided key area allocated to each key area, compared with a conventional QWERTY virtual keypad.

Further, repetitive key pressing for a character input can be avoided and input time can be reduced.

Although preferred embodiments of the present invention have been described in detail hereinabove, it should be understood that many variations and modifications of the basic inventive concept herein described, which may appear to those skilled in the art, will still fall within the spirit and scope of the preferred embodiments of the present invention as defined in the appended claims.

What is claimed is:

1. An input method in an electronic apparatus, the method comprising:
   displaying a virtual keypad having at least one key area to which a plurality of characters are allocated;
   displaying a plurality of areas when a touch is detected on the at least one key area;
   detecting whether the touch includes a drag; and
   inputting, after the drag is detected, a character mapped to an area corresponding to a point where the drag is released.

2. The method of claim 1, wherein a different set of characters is mapped to each area of the plurality of areas.

3. The method of claim 1, wherein the displayed virtual keypad changes layout according to a quantity of characters allocated to the at least one key area.

4. The method of claim 1, further comprising displaying, in a character input window, the character mapped to the area corresponding to the point where the drag is released.

5. The method of claim 1, wherein a sum of the plurality of areas is equivalent to a number of characters allocated to the touched key area.

6. The method of claim 1, wherein the displayed plurality of areas are distinguished using one of lines and colors.

7. The method of claim 1, further comprising inputting, when the touch is maintained for a predetermined time without a drag being detected, a character allocated to the touched at least one key area.

8. The method of claim 1, further comprising outputting audio signal indicating detection of the touch and outputting another audio signal indicating drag release.

9. The method of claim 1, wherein inputting the character comprises:
   determining a length of the drag from a point where the touch is detected to the point where the drag is released;
   identifying a concentric circle corresponding to the point where the touch is detected and the point where the drag is released;
   determining a character mapped to the identified concentric circle; and
   inputting the character mapped to the identified concentric circle.

10. The method of claim 9, wherein the concentric circle is identified by a radius of the length of the drag.

11. The method of claim 1, further comprising displaying a plurality of concentric circles arranged around the touched key area.

12. The method of claim 11, wherein a different character is mapped to each of the plurality of concentric circles.

13. The method of claim 11, wherein an uppercase character is mapped to one circle of the plurality of concentric circles and a lower case character is mapped to another circle of the plurality of concentric circles.

14. A character input apparatus comprising:
   a touch screen configured to detect a touch and a drag; and
   a controller configured to control display on the touch screen of a virtual keypad having at least one key area to which a plurality of characters are allocated, control display of a plurality of areas when a touch is detected on the at least one key area, and, after the drag is detected, control input of a character mapped to an area corresponding to a point where the drag is released.

15. The apparatus of claim 14, wherein, wherein a different set of characters is mapped to each area of the plurality of areas.

16. The apparatus of claim 14, wherein the displayed virtual keypad changes layout according to a quantity of characters allocated to the at least one key area.

17. The apparatus of claim 14, further comprising a character input window configured to display the character mapped to the area corresponding to the point where the drag is released.

18. The apparatus of claim 14, wherein a sum of the plurality of the areas is equivalent to a number of characters allocated to the touched key area.

19. The apparatus of claim 14, wherein the displayed plurality of areas are distinguished using one of lines and colors.

20. The apparatus of claim 14, wherein, when the touch is maintained for a predetermined time without a drag being detected, a character allocated to the touched at least one key area is input.

21. The apparatus of claim 14, further comprising a speaker configured to output an audio signal indicating detection of the touch and to output another audio signal indicating drag release.

22. The apparatus of claim 14, wherein a length of the drag is determined from a point where the touch is detected to the point where the drag is released, a concentric circle is identified corresponding to the point where the touch is detected and the point where the drag is released, a character mapped to the identified concentric circle is determined, and the character mapped to the identified concentric circle is input.

23. The apparatus of claim 22, wherein the concentric circle is identified by a radius of the length of the drag.

24. The apparatus of claim 14, wherein a plurality of concentric circles arranged around the touched key area are displayed.

25. The apparatus of claim 24, further comprising a storage unit for storing mapping information, wherein a different character is mapped to each of the plurality of concentric circles.

26. The apparatus of claim 24, wherein an uppercase character is mapped to one circle of the plurality of concentric circles and a lower case character is mapped to another circle of the plurality of concentric circles.

27. A character input apparatus comprising:
   a virtual keypad configured to display at least one key area to which a plurality of characters are allocated; and
   a detector configured to detecting whether a touch on the virtual keyboard includes a drag,
   wherein, if a touch is detected on the at least one key area, a plurality of areas are displayed, with a set of characters mapped to each area of the plurality of areas and, if drag is detected with the touch, a character is mapped to an area corresponding to a point where the drag is released.

* * * * *